United States Patent
Kusaka et al.

(10) Patent No.: US 6,833,992 B2
(45) Date of Patent: Dec. 21, 2004

(54) ELECTRONIC APPARATUS HAVING A PLURALITY OF RADIATORS IN WHICH LIQUID COOLANT FLOWS

(75) Inventors: Hiroyuki Kusaka, Ome (JP); Kentaro Tomioka, Sayama (JP); Mitsuyoshi Tanimoto, Sagamihara (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/665,563

(22) Filed: Sep. 22, 2003

(65) Prior Publication Data

US 2004/0114324 A1 Jun. 17, 2004

(30) Foreign Application Priority Data

Sep. 20, 2002 (JP) .................................... 2002-275494

(51) Int. Cl.[7] .............................................. H05K 7/20
(52) U.S. Cl. .................. 361/699; 361/687; 361/689; 361/690; 361/695; 361/698; 174/15.1; 165/80.4; 62/259.2
(58) Field of Search ........................ 361/687–690, 361/695, 698, 699, 700; 257/714; 174/15.1, 15.2; 165/80.4, 104.33; 62/259.2

(56) References Cited

U.S. PATENT DOCUMENTS 5,606,341 A * 2/1997 Aguilera ..................... 345/87
6,097,597 A * 8/2000 Kobayashi .................. 361/687
6,250,378 B1 * 6/2001 Kobayashi ............. 165/104.33
6,556,439 B2 * 4/2003 Shibasaki ................... 361/687
6,674,642 B1 * 1/2004 Chu et al. ................... 361/687
2004/0001312 A1 * 1/2004 Hotta et al. ................. 361/687

FOREIGN PATENT DOCUMENTS

JP      07-142886      6/1995

* cited by examiner

Primary Examiner—Boris Chervinsky
(74) Attorney, Agent, or Firm—Finnegan, Henderson, Farabow, Garrett & Dunner, L.L.P.

(57) ABSTRACT

An electronic apparatus comprises a heat-generating component, a main unit having a heat-receiving portion thermally connected to the heat-generating component, and a display unit supported by the main unit. The display unit incorporates a heat-radiating portion which radiates the heat of the heat-generating component. A circulating path connects the heat-receiving portion and the heat-radiating portion and circulates liquid coolant. The heat-radiating portion includes a first radiator and a second radiator. The radiators are connected in series in a direction in which the liquid coolant flows. The second radiator is located at the downstream of the liquid coolant, and is exposed outside the display unit.

20 Claims, 14 Drawing Sheets

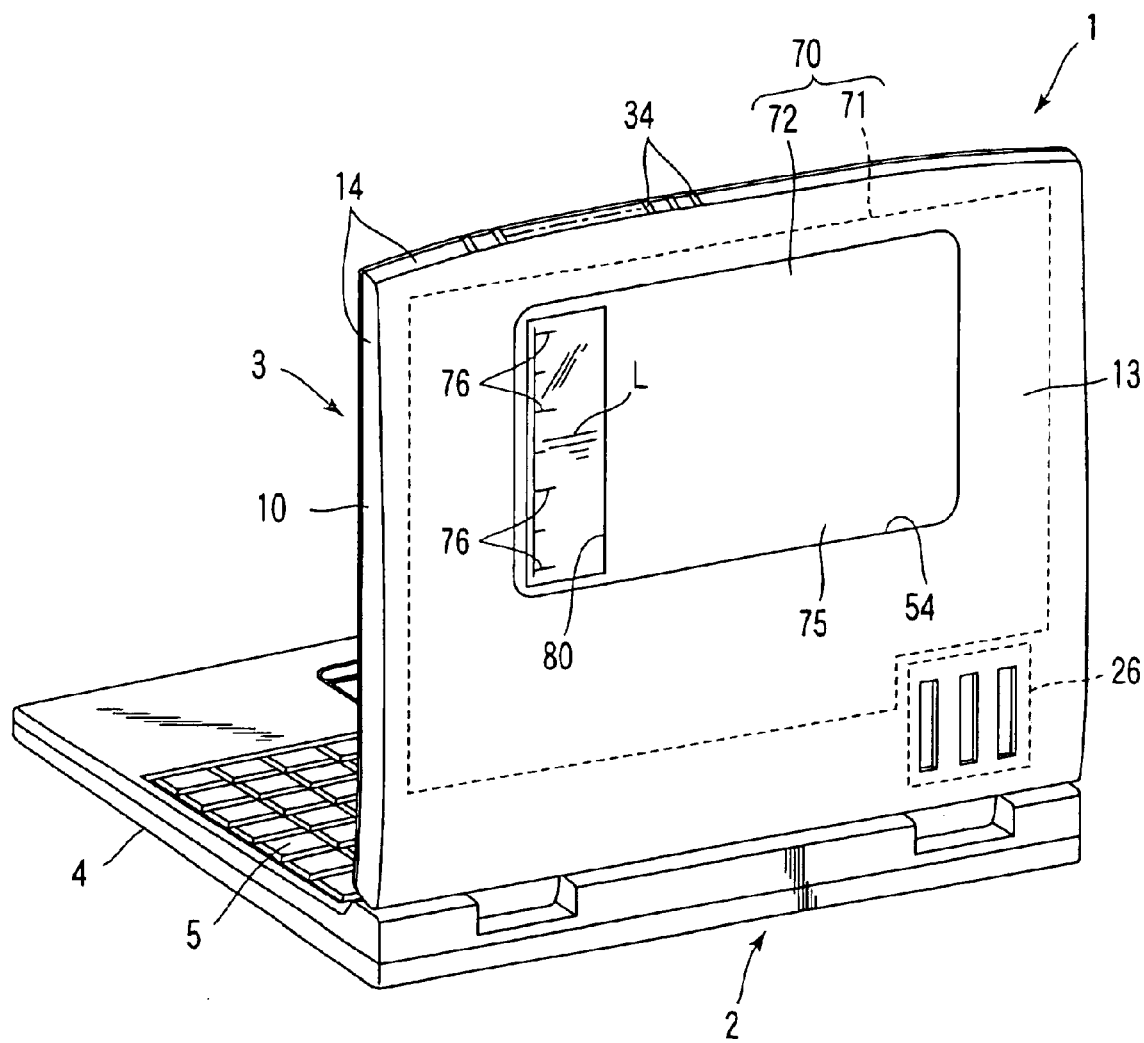
F I G. 13

ELECTRONIC APPARATUS HAVING A PLURALITY OF RADIATORS IN WHICH LIQUID COOLANT FLOWS

CROSS-REFERENCE TO RELATED APPLICATIONS

This application is based upon and claims the benefit of priority from the prior Japanese Patent Application No. 2002-275494, filed Sep. 20, 2002, the entire contents of which are incorporated herein by reference.

BACKGROUND OF THE INVENTION

1. Field of the Invention

The present invention relates to a liquid-cooled electronic apparatus that has radiators provided at the back of a display panel and is designed to radiate heat from, for example a CPU (Central Processing Unit). More particularly, the invention relates to the structure of the radiators in which liquid coolant flows.

2. Description of the Related Art

A CPU is incorporated in, for example, notebook-type portable computers. The heat that the CPU generates while operating increases as its data-processing speed rises and it performs more and more functions. The higher the temperature of the CPU, the less efficiently it operates. To cool the CPU, so-called cooling system of liquid cooling type has been developed in recent years. A liquid-cooling system uses a liquid coolant that has a far higher specific heat than air.

Japanese Patent Application KOKAI publication No. 7-142886 discloses a cooling system of liquid cooling type, configured for use in portable computers that comprise a main unit and a display unit. The cooling system comprises a heat-receiving header, heat-radiating header, and a tube. The heat-receiving header is provided in the main unit and is thermally connected to the CPU incorporated in the main unit. The heat-radiating header is provided in the display unit and is located at the back of the display panel incorporated in the display unit. The tube extends from the main unit to the display unit to circulate the liquid coolant between the heat-receiving header and the heat-radiating header.

The display unit has a display housing. The display housing contains the display panel and the heat-radiating header. The heat-radiating header is provided between the back of the display housing and the display panel. The heat-radiating header is thermally connected to the back of the display housing. The liquid coolant transfers the heat of the CPU from the heat-radiating header to the display housing. The heat is radiated from the surface of the display housing.

The higher the surface temperature of the display housing, the greater the amount of heat radiated from the display housing. In other words, the heat-radiating efficiency of the heat-radiating header is proportional to the surface temperature of the display housing. However, the surface temperature of the display housing cannot be raised so much. This is because the user needs to touch the display housing to open or close the display unit.

Some measures should be taken to prevent the surface temperature of the display housing from increasing over, for example, 60° C. If such measures are taken, however, the amount of heat that may be radiated from the heat-radiating header will be 10-odd watts (W) at best. Consequently, the conventional cooling system cannot cool the CPU as much as desired. The system may fail to radiate the increasing amount of heat that the CPU generates while operating.

BRIEF SUMMARY OF THE INVENTION

According to an embodiment of the present invention, there is provided an electronic apparatus comprising: a heat-generating component; a main unit having a heat-receiving portion thermally connected to the heat-generating component; a display unit supported by the main unit; a heat-radiating portion provided in the display unit and radiating the heat generated by the heat-generating component; and a circulating path circulating liquid coolant between the heat-receiving portion and the heat-radiating portion. The heat-radiating portion includes a first radiator and a second radiator. The radiators are connected in series in a direction in which the liquid coolant flows. The second radiator is located at the downstream of the liquid coolant, and is exposed outside the display unit.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 13 is a perspective view of a portable computer according to a fourth embodiment of this invention, which depicts the positional relation between the reservoir and the display unit;

DETAILED DESCRIPTION OF THE INVENTION

The first embodiment of the present invention, which is a portable computer 1, will be described with reference to FIGS. 1 to 7.

Figure 1:
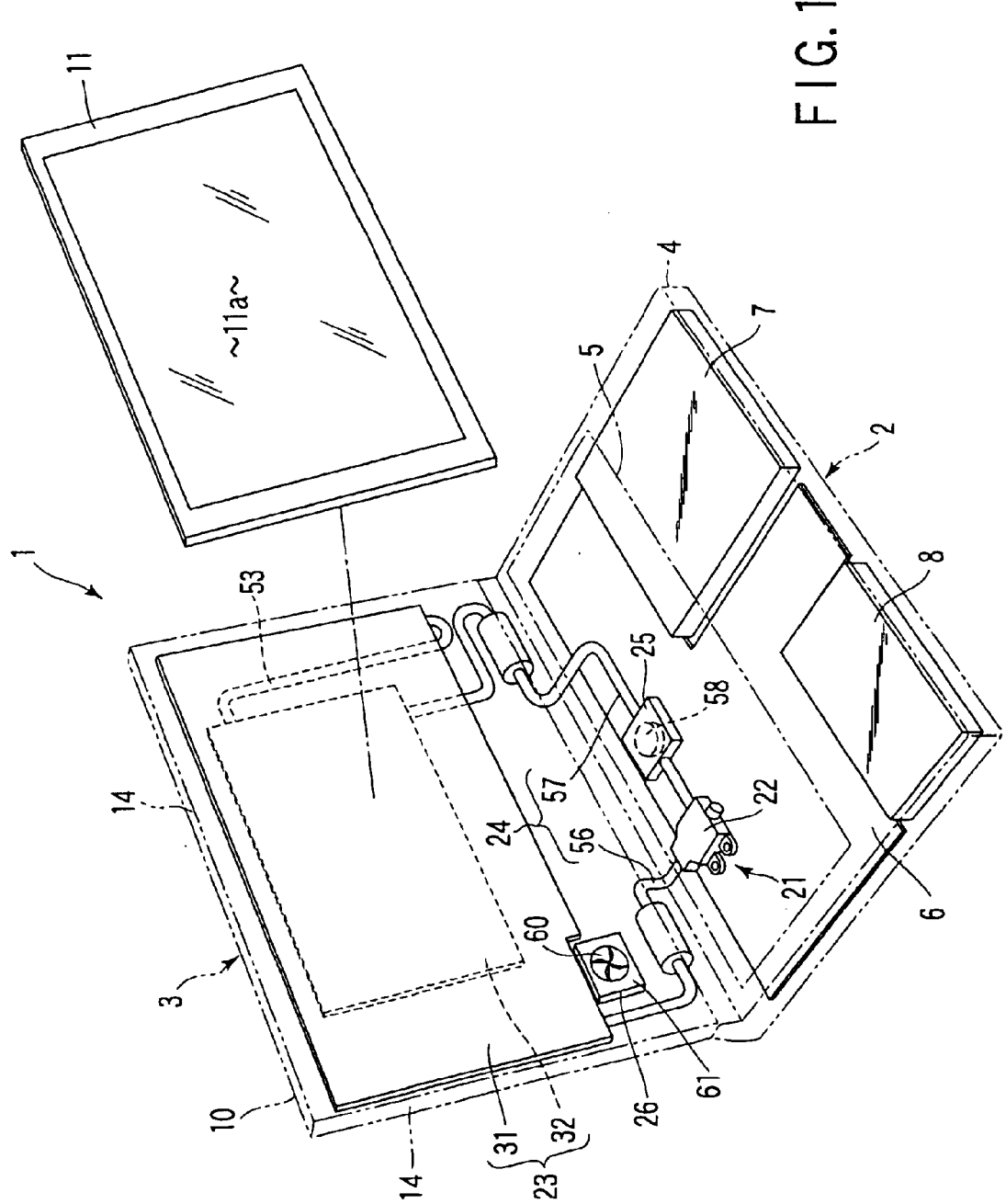
FIG. 1 is a perspective view of a portable computer according to a first embodiment of this embodiment, which incorporates a cooling unit of liquid cooling type.
Figure 2:
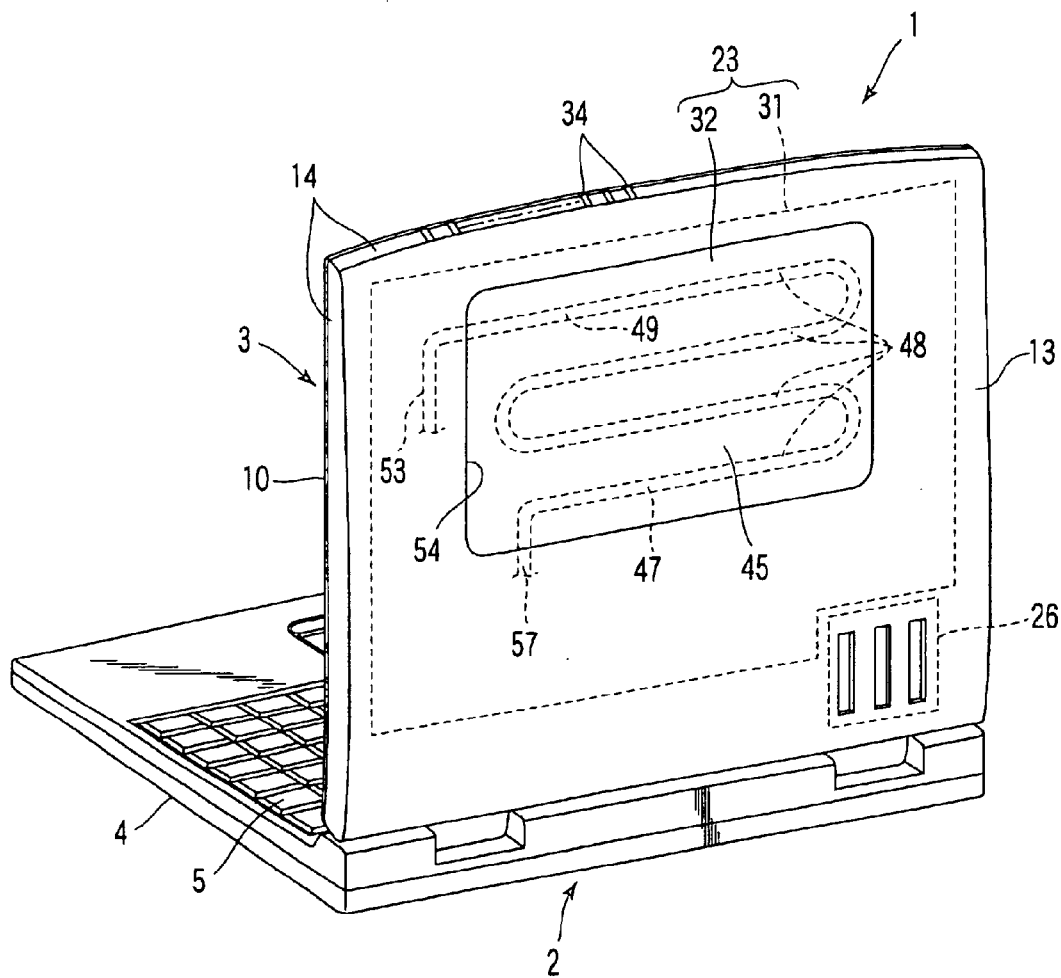
FIG. 2 is a perspective view of the portable computer according to the first embodiment, which illustrates the positional relation between the second radiator and the display unit.

FIGS. 1 and 2 show a portable computer 1, or an electronic apparatus according to this invention. The portable computer 1 comprises a computer main unit 2 and a display unit 3. The computer main unit 2 has a housing 4 that is shaped like a flat box. The housing 4 supports a keyboard 5. It contains a printed wiring board 6, a CD-ROM drive 7 and a hard disk drive 8.

The display unit 3 comprises a display housing 10 and a liquid crystal display panel 11. The display housing 10 is shaped like a flat box. The housing 10 comprises a front wall 12, a back wall 13 and four side walls 14. The housing 10 contains the liquid crystal display panel 11. The display panel 11 has a screen 11a that displays images. The screen 11a is exposed outside the display housing 10, through the opening 15 made in the front wall 12.

The display housing 10 is coupled to the rear edge of the housing 4 by means of hinges (not shown). The display unit 3 can therefore rotate between a closed position and an opened position. At the closed position, the display unit 3 covers the keyboard 5 from above. At the opened position, the display unit 3 stands up, exposing the keyboard 5 and the screen 11a.

Figure 5:
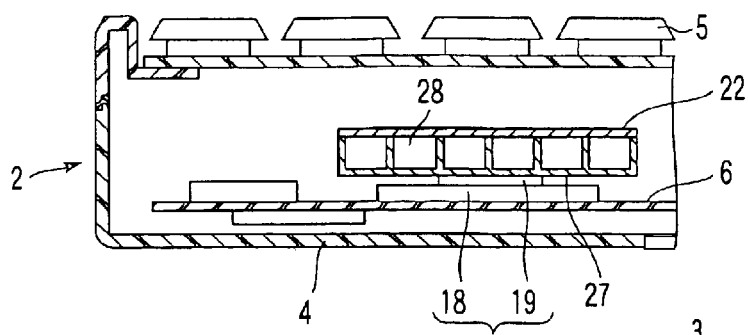
FIG. 5 is a sectional view of the portable computer according to the first embodiment, which depicts the positional relation between the CPU and the heat-receiving portion.
Figure 6:
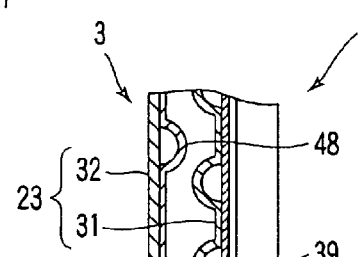
FIG. 6 is a sectional view of the heat-receiving portion used in the first embodiment of the present invention.

As FIG. 5 shows, a CPU 17, or a heat-generating component, is mounted on the upper surface of the printed wiring board 6. The CPU 17 has a base 18 and an IC chip 19 mounted on the center part of the base 18. The IC chip 19 generates much heat as it operates, processing data at high speed and performing many functions. The IC chip 19 must be cooled to keep operating in stable condition.

As seen from FIGS. 1 to 4, the portable computer 1 further comprises a cooling unit 21 of liquid cooling type for cooling the CPU 17. The cooling unit 21 comprises a heat-receiving portion 22, a heat-radiating portion 23, a circulating path 24, a pump 25 and an electric fan 26.

As FIG. 5 depicts, the heat-receiving portion 22 is secured to the upper surface of the printed wiring board 6. It is a flat box and somewhat larger than the CPU 17. The heat-receiving portion 22 has a flat lower surface, which functions as a heat-receiving surface 27. The heat-receiving surface 27 contacts a layer of heat-conductive grease (not shown) or a heat-conductive sheet (not shown). The sheet in turn contacts the IC chip 19 of the CPU 17. Hence, the heat-receiving surface 27 is thermally connected to the IC chip 19 of the CPU 17.

The heat-receiving portion 22 has a coolant passage 28, a coolant inlet port 29, and a coolant outlet port 30. The coolant passage 28 is provided in the heat-receiving portion 22. It is thermally connected to the IC chip 19 at the heat-receiving surface 27. The coolant inlet port 29 and coolant outlet port 30 are located at upstream and downstream of the coolant passage 28, respectively.

Figure 3:
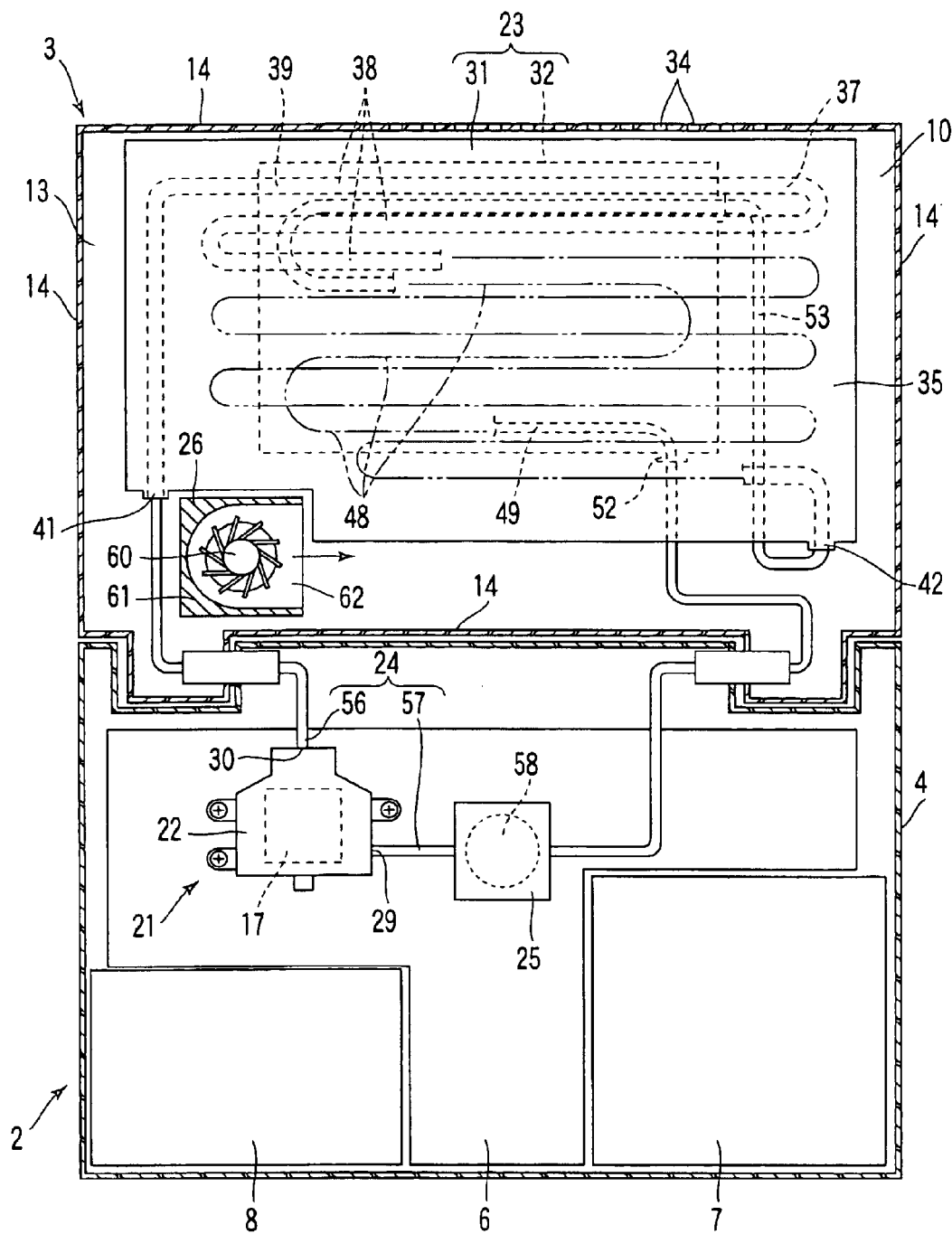
FIG. 3 is a sectional view of the portable computer according to the first embodiment, which incorporates the cooling unit.
Figure 7:
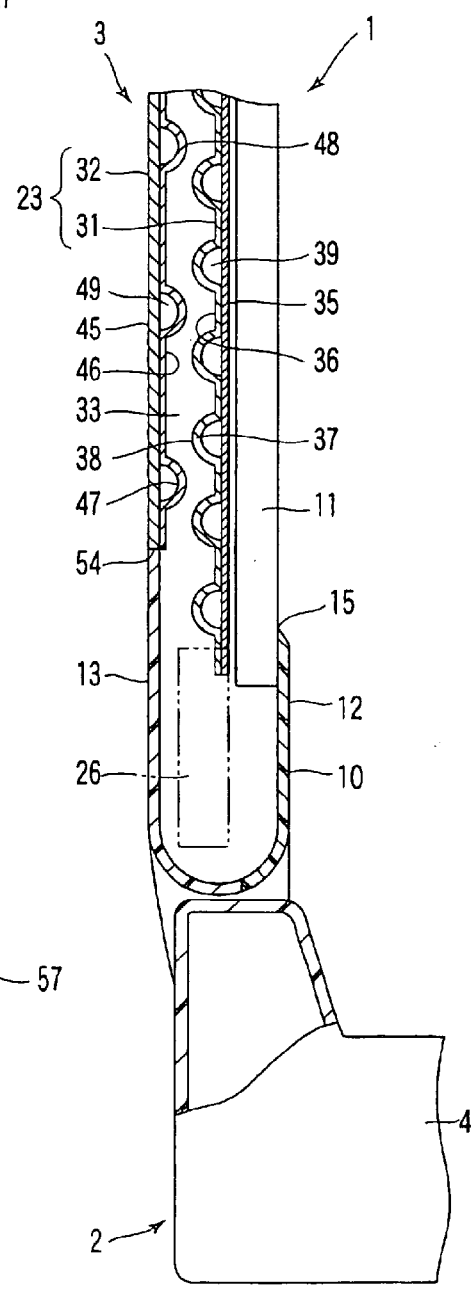
FIG. 7 is a sectional view of the portable computer according to the first embodiment of the invention, which represents the positional relation between the first radiator, second radiator and liquid crystal display panel.

As FIGS. 3 and 7 illustrate, the heat-radiating portion 23 is incorporated in the display housing 10 of the display unit 3. The heat-radiating portion 23 comprises two radiators 31 and 32. The first radiator 31 is shaped like a rectangular plate and has almost the same size as the liquid crystal display panel 11. The first radiator 31 is interposed between the liquid crystal display panel 11 and the back wall 13 of the display housing 10. The second radiator 32 is shaped like a rectangular plate, too, and smaller than the first radiator 31. The second radiator 32 is located at the back of the first radiator 31. Thus, the liquid crystal display panel 11, first radiator 31 and second radiator 32 are arranged in the direction of thickness of the display housing 10.

The first and second radiators 31 and 32 are secured to the back wall 13 of the display housing 10. They are spaced apart and opposing each other, at the back of the liquid crystal display panel 11. A cooling-air passage 33 is provided between the radiators 31 and 32. The cooling-air passage 33 communicates, at its downstream end, with a plurality of exhaust holes 34 made in one of the side walls 14. The exhaust holes 34 are positioned at the upper edge of the display housing 10 while the housing 10 remains in its opened position.

As seen from FIG. 7, the first radiator 31 comprises two heat-radiating plates 35 and 36. The heat-radiating plates 35 and 36 are made of heat-conductive metal such as aluminum alloy. They are laid one upon the other.

The second heat-radiating plate 36 has a bulging part 37. The bulging part 37 swells from the first heat-radiating plate 35 and opens thereto. As FIG. 3 shows, the bulging part 37 is a long trough and meanders over almost the entire second heat-radiating plate 36. It has straight portions 38 that extend parallel to one another and are spaced apart from one another. The first heat-radiating plate 35 closes the opening of the bulging part 37. Thus, the first heat-radiating plate 35 and the bulging part 37 of the second heat-radiating plate 36 define a coolant passage 39.

The first radiator 31 has a coolant inlet port 41 and a coolant outlet port 42. The port 41 and 42 are located, respectively upstream and downstream of the coolant passage 39. The ports 41 and 42 are spaced apart in the widthwise direction of the display unit 3. The first radiator 31 is arranged in the display housing 10. It is positioned, with the second heat-radiating plate 36 opposing the back wall 13 of the display housing 10. The bulging part 37 is therefore exposed to the cooling-air passage 33.

The second radiator 32 is identical in basic structure to the first radiator 31. As FIG. 7 depicts, the second radiator 32 comprises two heat-radiating plates 45 and 46. Both heat-radiating plates 45 and 46 are made of heat-conductive metal such as aluminum alloy. They are laid one upon the other.

The second heat-radiating plate 46 has a bulging part 47. The bulging part 47 swells from the first heat-radiating plate 45 and opens thereto. As FIG. 3 shows, the bulging part 47 is a long trough and meanders over almost the entire second heat-radiating plate 46. It has straight portions 48 that extend parallel to one another and are spaced apart from one another. The first heat-radiating plate 45 closes the opening of the bulging part 47. The first heat-radiating plate 45 and the bulging part 47 of the second heat-radiating plate 46 define a coolant passage 49.

Figure 4:
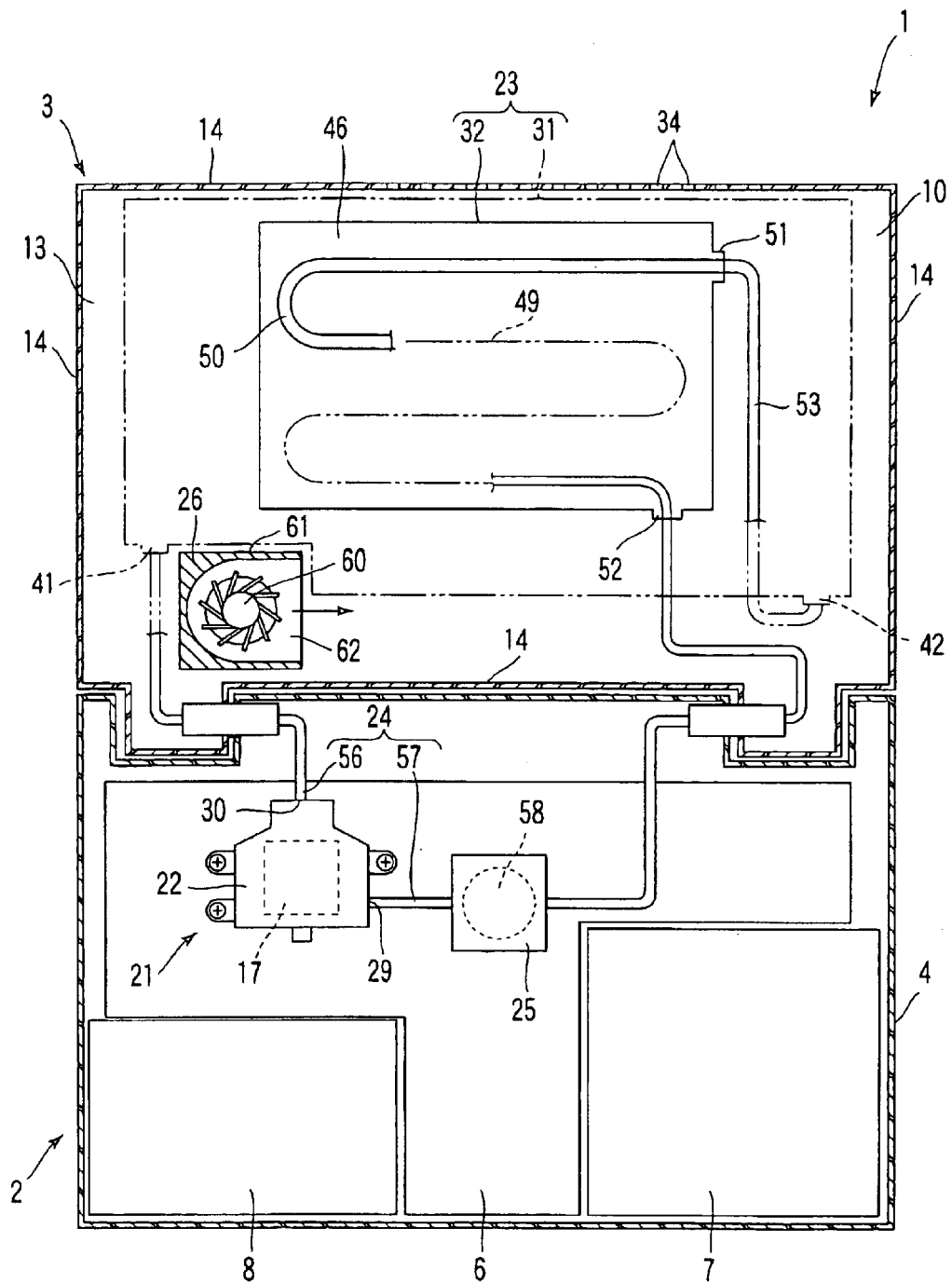
FIG. 4 is a sectional view of the portable computer according to the first embodiment, which shows the positional relation between the first and second radiators.

As illustrated in FIG. 4, the second radiator 32 has a coolant inlet port 51 and a coolant outlet port 52. The coolant inlet port 51 is located at the upstream of the coolant passage 49. The port 51 is positioned at the upper edge of the second radiator 32 while the display unit 3 remains in its opened position. The coolant outlet port 52 is located at the downstream of the coolant passage 49. The port 52 is positioned at the lower edge of the second radiator 32 while the display unit 3 remains in its opened position. A flexible tube 58 connects the coolant inlet port 51 of the second radiator 32 to the coolant outlet port 42 of the first radiator 31. Thus, the first radiator 32 and the second radiator 32 are connected in series to each other.

The second radiator 32 is incorporated in the display housing 10. It is positioned, with the second heat-radiating plate 46 opposing the first radiator 31. The bulging part 47 is therefore exposed to the cooling-air passage 33. As shown in FIG. 7, the bulging part 37 of the first radiator 31 and the bulging part 47 of the second radiator 32 are displaced from each other, not facing each other. In other words, the straight portions 48 of the bulging part 47 lie between the straight portions 38 of the bulging part 37. This reduces the gap between the radiators 31 and 32 can yet provides the cooling-air passage 33 between the radiators 31 and 32.

As FIGS. 2 and 7 depict, the back wall 13 of the display housing 10 has a rectangular opening 54. The opening 54 is as large as the first heat-radiating plate 45 of the second radiator 32. The first heat-radiating plate 45 is fitted in the opening 54. The opening 54 exposes the plate 45 outside the display unit 3. The surface of the first heat-radiating plate 45 lies in flush with the outer surface of the back wall 13 of the display housing 10.

As FIGS. 1, 3 and 4 show, the circulating path 24 comprises a forward path 56 and a backward path 57. The forward path 56 extends between the housing 4 and the display housing 10. It connects the coolant outlet port 30 of the heat-receiving portion 22 to the coolant inlet port 41 of the first radiator 31. The backward path 57 extends between the housing 4 and the display housing 10. The path 57 connects the coolant outlet port 52 of the second radiator 32 to the coolant inlet port 29 of the heat-receiving portion 22. Thus, the circulating path 24 connects the coolant passage 28 of the heat-receiving portion 22, the coolant passage 39 of the first radiator 32 and the coolant passage 49 of the second radiator 32. The passages 28, 39 and 49 are filled with liquid coolant.

The pump 25 is provided on the backward path 57, for circulating the liquid coolant between the heat-receiving portion 22 and the heat-radiating portion 23. The pump 25 is contained in the housing 4. It has an impeller 58 that is driven by a motor. The impeller 58 starts rotating, for example, when the power switch to the portable computer 1 is closed or when the temperature of the CPU 17 rises above a predetermined value.

The electric fan 26 is provided in the display housing 10 of the display unit 3. The fan 26 applies cooling air into the cooling-air passage 33 provided between the first radiator 31 and the second radiator 32. The fan 26 comprises a centrifugal impeller 60 and a fan casing 61. The fan casing 61 contains the impeller 60 and has an air-discharging port 62. The impeller 60 starts rotating, for example, when the power switch to the portable computer 1 is closed or when the temperature of the CPU 17 rises above the predetermined value. As the impeller 60 rotates, cooling air is applied to the upstream end of the cooling-air passage 33 from the air-discharging port 62 of the fan casing 61.

How the cooling unit 21 performs its function will be explained.

The IC chip 19 of the CPU 17 generates heat duding the use of the portable computer 1. The heat that the IC chip 19 generates is transferred to the heat-receiving surface 27 of the heat-receiving portion 22. As indicated earlier, the heat-receiving portion 22 has the coolant passage 28 filled with the liquid coolant. Therefore, the liquid coolant absorbs a greater part of the heat transferred to the heat-receiving surface 27.

When the impeller 58 of the pump 25 rotates, the liquid coolant is forced into the heat-receiving portion 22. The liquid coolant is made to flow through the circulating path 24. The liquid coolant flowing in the coolant passage 28 absorbs the heat generated by the CPU 17. In other words, the liquid coolant is heated. The liquid coolant thus heated is pumped into the first radiator 31 via the forward path 56 and then flows through the coolant passage 39. While flowing through the coolant passage 39, the liquid coolant releases the heat. The heat diffuses in the first heat-radiating plate 45 and second heat-radiating plate 46. The plates 45 and 46 radiate the heat from their surfaces.

The liquid coolant cooled by virtue of heat-exchange in the first radiator 31 is supplied to the second radiator 32 through the tube 53. The coolant then flows in the coolant passage 49. While the coolant is flowing in the passage 49, the heat of the CPU 17, absorbed in the coolant, diffuses into the first and second heat-radiating plates 45 and 46. The plates 45 and 46 radiate the heat from their surfaces.

The first heat-radiating plate 45 of the second radiator 32 is exposed outside the display unit 3 through the opening 54 of the display housing 10. Hence, the plate 45 contacts the air outside the display housing 10. The first heat-radiating plate 45 can therefore radiate heat efficiently.

The liquid coolant is cooled as heat exchange undergoes at the second radiator 32. The coolant thus cooled flows back into the coolant passage 28 through backward path 57. While flowing through the coolant passage 28, the liquid coolant absorbs the heat from the CPU 17. The coolant is then supplied to the first radiator 31 and the second radiator 32. This cooling cycle is repeated. As a result, the heat is transferred from the CPU 17 to the first and second radiators 31 and 32 incorporated in the display unit 3. Finally, the radiators 31 and 32 radiate the heat, which is released from the display unit 3.

When the impeller 60 of the electric fan 26 rotates, the cooling air is forced from the air-discharging port 62 of the fan casing 61 into the cooling-air passage 33 that is provided between the first radiator 31 and second radiator 32. While flowing in the cooling-air passage 33, the air cools the first radiator 31 and the second radiator 32. The second heat-radiating plate 36 of the first radiator 31 has the bulging part 37 that is exposed in the cooling-air passage 33. Similarly, the second-heat radiating plate 46 of the second radiator 32 has the bulging part 47 that is exposed in the cooling-air passage 33. The bulging parts 37 and 47 function as cooling fins, which extend in the cooling-air passage 33. The cooling air flows along these cooling fins. As a result, the area at which the radiators 31 and 32 contact the cooling air flowing in the cooling-air passage 33 increases, enhancing the cooling efficiency of the radiators 31 and 32.

The cooling air absorbs and takes away the heat transferred from the CPU 17 to the first radiator 31 and the second radiator 32. The cooling air heated as heat exchange undergoes at the radiators 31 and 32 is discharged from the exhaust holes 34 of the display unit housing 10 to the outside the display unit 3.

In the first embodiment of this invention, the heat-radiating portion 23 incorporated in the display unit 3 has two radiators 31 and 32. The radiators 31 and 32 are spaced apart, opposing each other, at the back of the liquid crystal display panel 11. Therefore, the heat-radiating portion 23 has a larger surface and a higher heat-radiating efficiency than otherwise.

Particularly in the first embodiment, the first radiator 31 and second radiator 32 are positively cooled with the cooling air applied by the electric fan 26. The heat radiated from the radiators 31 and 32 is therefor hardly accumulated in the display housing 10. In addition, the first heat-radiating plate 45 of the second radiator 32 contacts the air outside the display unit 3 because it is exposed outside the housing 10. The heat-radiating efficiency of both radiators 31 and 32 therefore increases. Namely, the heat of the CPU 17 can be released from the display unit 3 with high efficiency.

The liquid coolant heated by the heat exchanging in the heat-receiving portion 22 is cooled in the first radiator 31. The liquid coolant thus cooled is let into the second radiator 32. Larger than the second radiator 32, the first radiator 32 radiates more heat than the second radiator 32. Therefore, the liquid coolant has been cooled to some extent before it is led into the second radiator 32. This maintains the second radiator 32, and thus the first and second heat-radiating plates 45 and 46, at a sufficiently low temperature.

Hence, the first heat-radiating plate 45 exposed outside the display housing 10 would not become so hot. No problem will arise if the user of the portable computer 1 touches the first heat-radiating plate 45.

Figure 8:
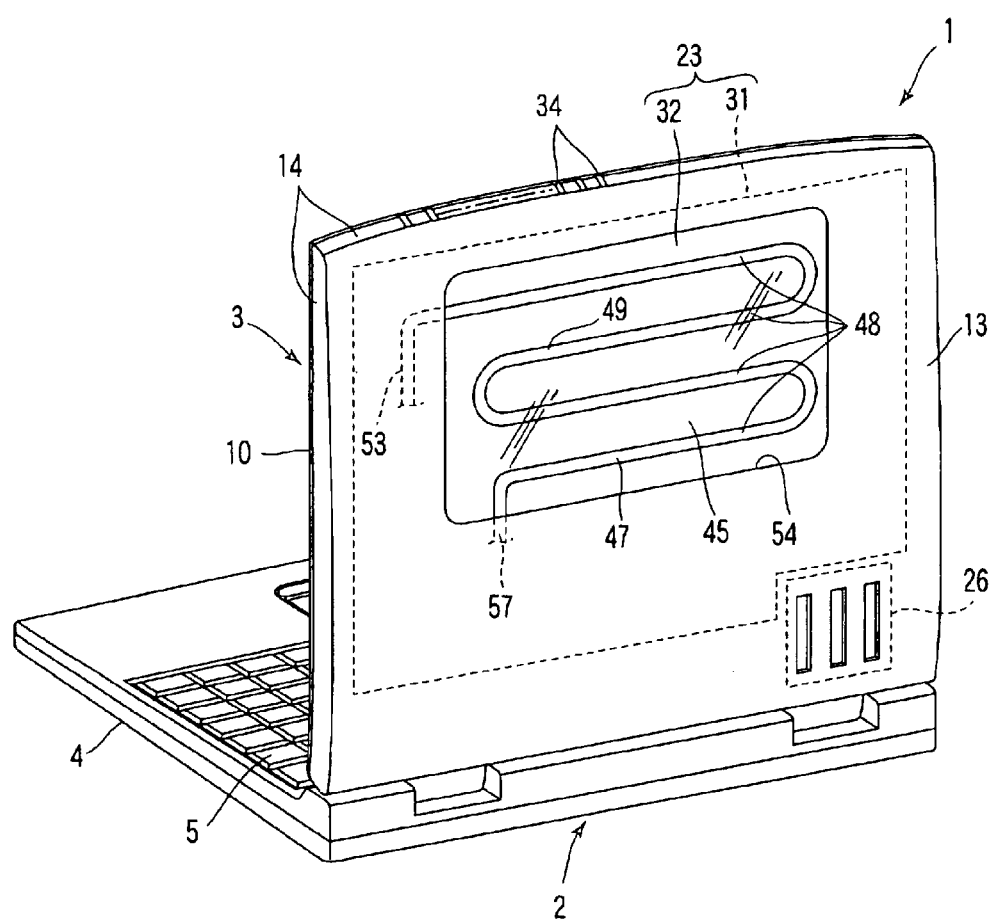
FIG. 8 is a perspective view of a portable computer according to a second embodiment of the invention, which illustrates the positional relation between the second radiator and the display unit.
Figure 9:
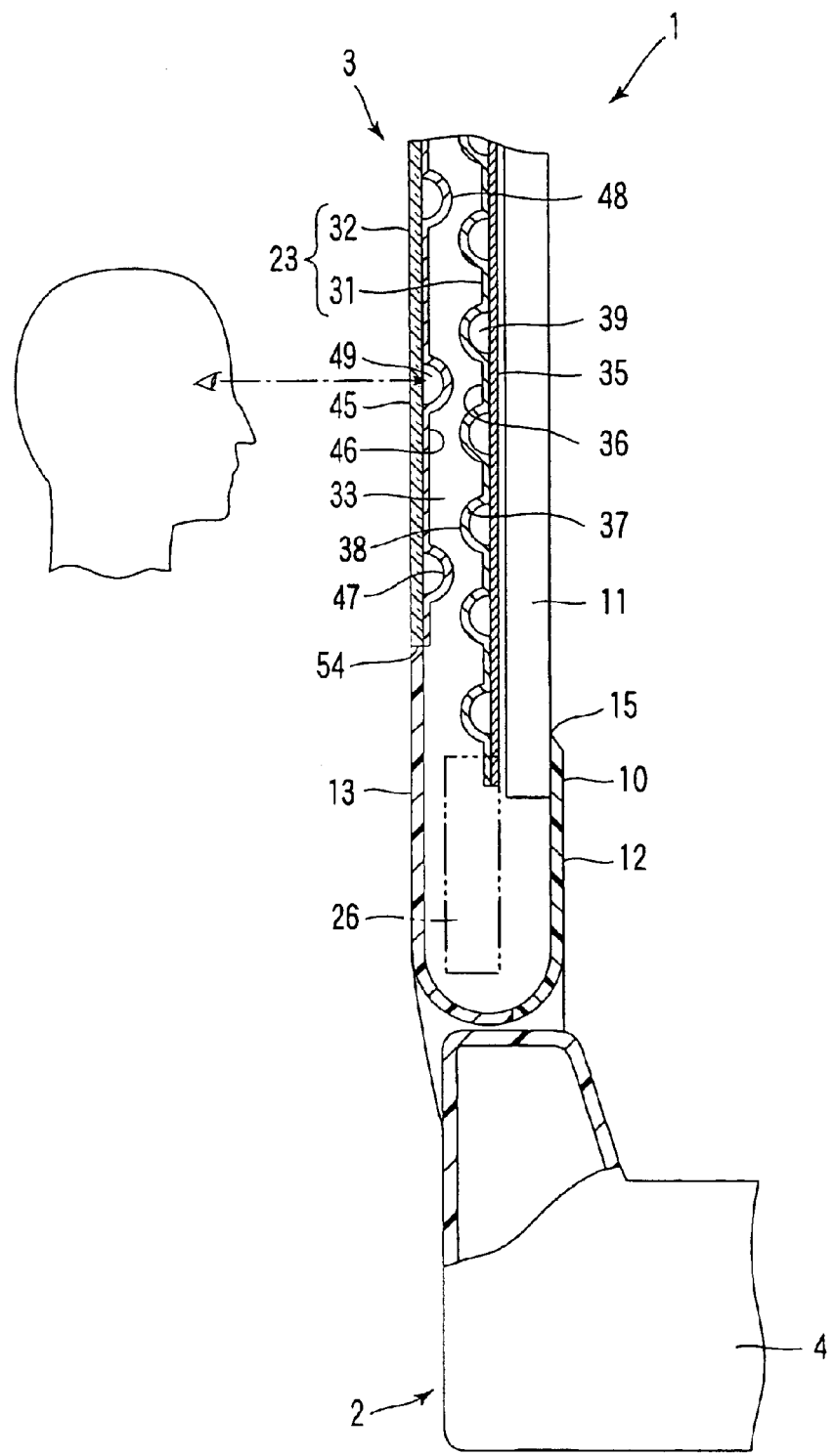
FIG. 9 is a sectional view of the portable computer according to the second embodiment, which represents the positional relation between the first radiator, second radiator and liquid crystal display panel.

The present invention is not limited to the first embodiment described above. FIGS. 8 and 9 show a second embodiment of the invention.

The second embodiment differs from the first embodiment, only in the structure of the second radiator 32. That is, it is identical to the first embodiment in any other respect. The components similar or identical to those of the first embodiment are designated at the same reference numerals and will not be described in detail.

As FIGS. 8 and 9 depict, the first heat-radiating plate 45 of the second radiator 32 is made of transparent synthetic resin such as polycarbonate resin or acrylic resin. Such synthetic resins are water-absorbent. The liquid coolant inevitably passes through the first heat-radiating plate 45 after a long use of the second radiator 32. In view of this it is desired that the plate 45 be made of transparent synthetic resin that can absorb 0.4% of water at most. If made of such a transparent resin, the first heat-radiating plate 45 can control the evaporation of the liquid coolant and, ultimately, shortage thereof.

Since the first heat-radiating plate 45 is made of transparent synthetic resin, the coolant passage 49 provided between the plate 45 and the second heat-radiating plate 46 can be seen from outside the display housing 10. The liquid coolant is, for example, an antifreeze liquid prepared by adding ethylene glycol solution and, if necessary, corrosion inhibitor to water. The antifreeze liquid is a colored liquid, for example, pink liquid. Thus, the user can perceive the shape of the coolant passage 49, just looking at the display unit 10 and seeing the antifreeze liquid flowing in the coolant passage 49.

In the portable computer 1 according to the second embodiment, the coolant passage 49 of the second radiator 32 can be seen from outside. This imparts good outer appearance to the computer 1 and distinguishes the computer 1 in design from the conventional portable computers.

In the second embodiment, the first heat-radiating plate 45 is transparent in its entirety. Nonetheless, the plate 45 may not be entirely transparent in this invention, but only at the part that defines the coolant passage 49.

Figure 10:
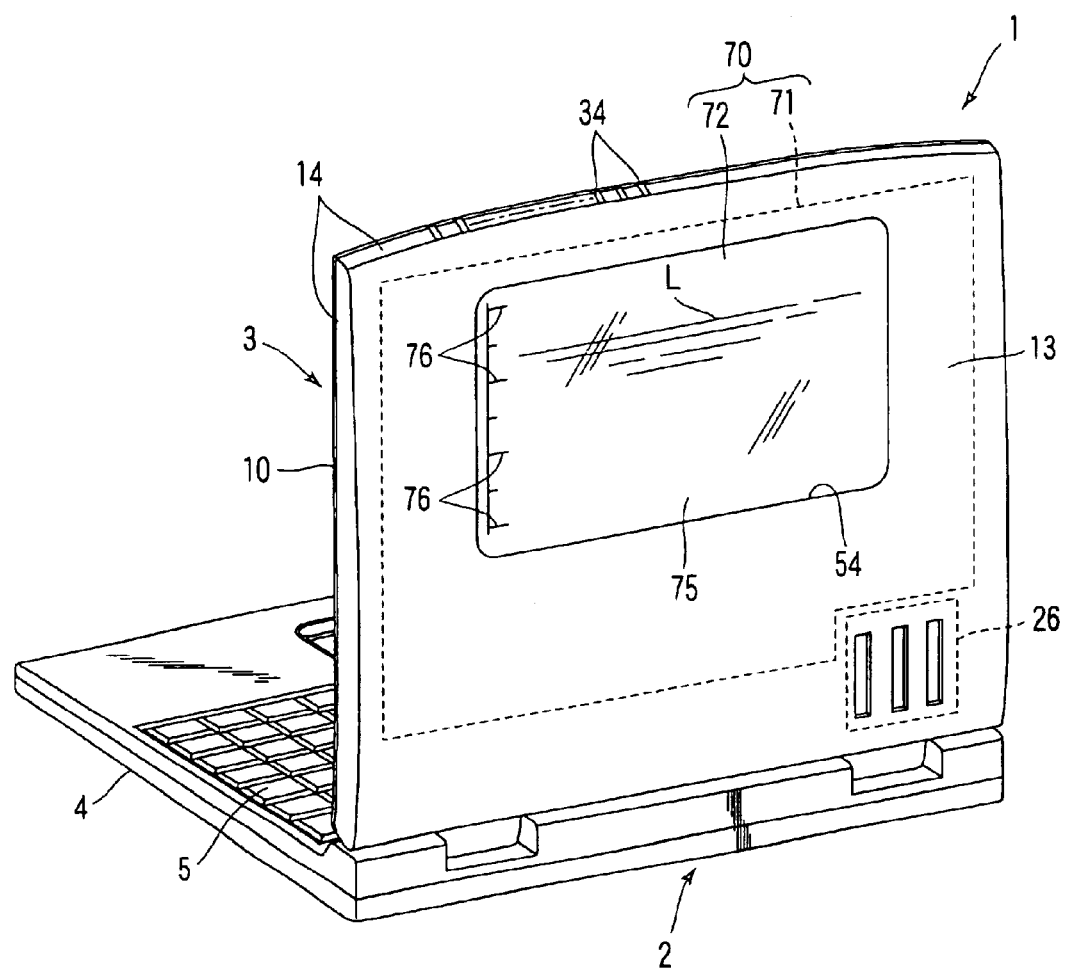
FIG. 10 is a perspective view of a portable computer according to a third embodiment of the invention, which depicts the positional relation between the reservoir and the display unit.
Figure 11:
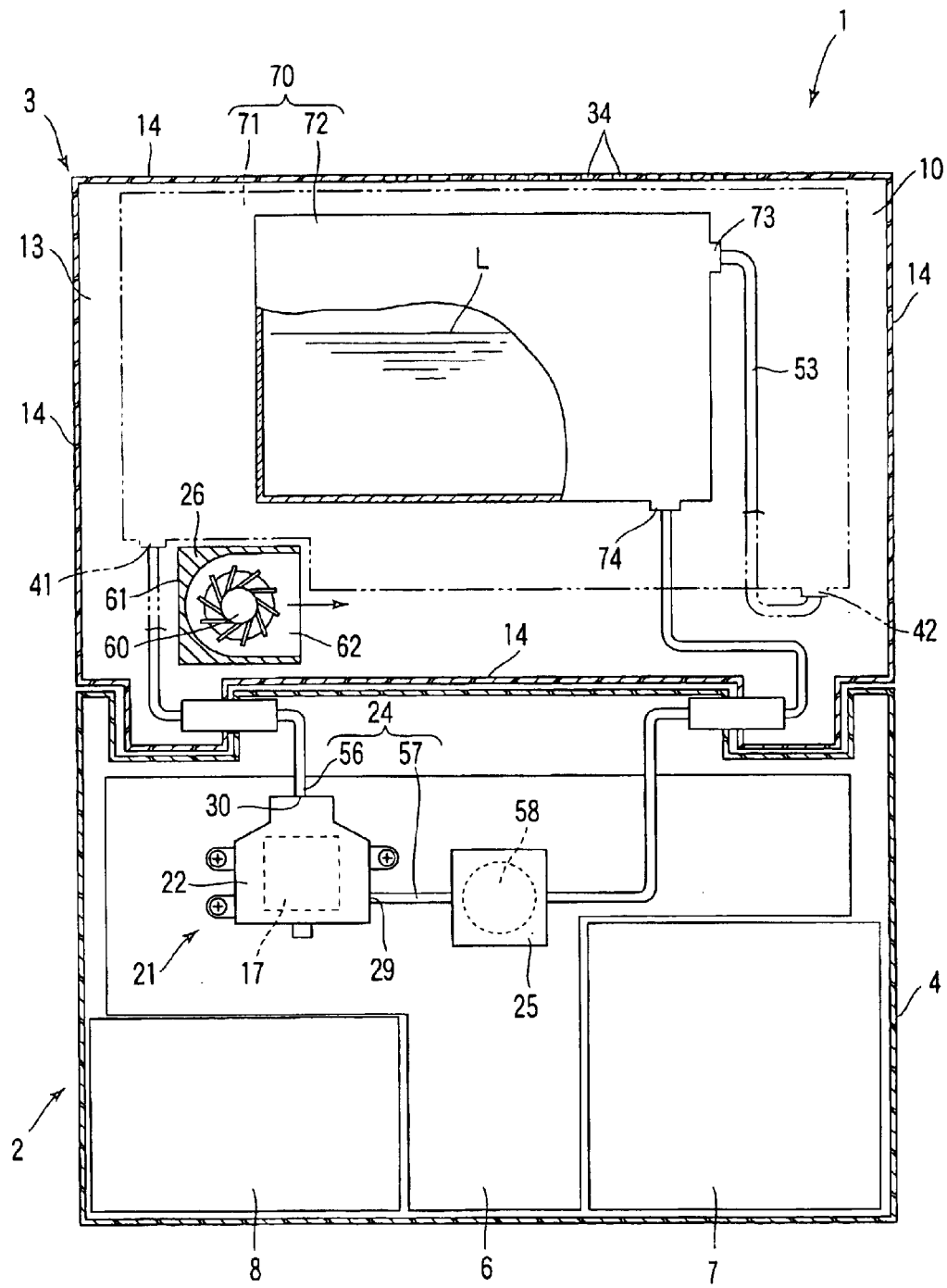
FIG. 11 is a sectional view of the portable computer according to the third embodiment, which shows the positional relation between the reservoir and the radiator.
Figure 12:
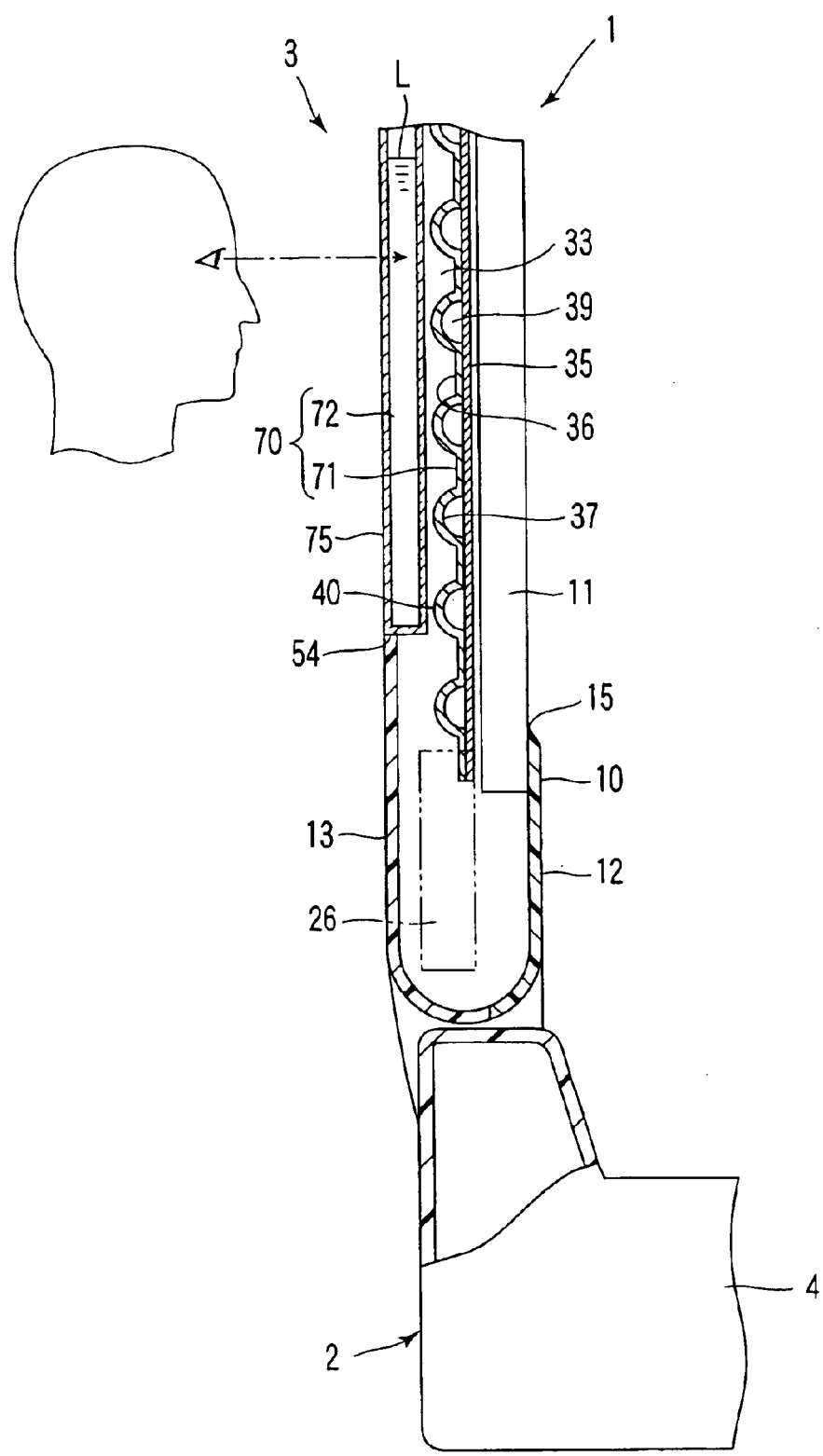
FIG. 12 is a sectional view of the portable computer according to the third embodiment, which shows the positional relation between the reservoir, radiator and liquid crystal display panel.

FIGS. 10 to 12 shows a third embodiment of this invention.

The third embodiment differs from the first embodiment in the structure of a heat-radiating portion 70 that is incorporated in the display unit 3. In any other respect the portable computer 1 according to the third embodiment is identical to the first embodiment.

As FIGS. 11 and 12 depict, the heat-radiating portion 70 has one radiator 71 and a reservoir 72. The radiator 71 has the same structure as the first radiator 31 used in the first embodiment. The components of the radiator 71 are designated at the same reference numerals as those of the radiator 31 and will not be described in detail.

The reservoir 72 is held in the display housing 10, together with the radiator 71. The reservoir 72 is shaped like a flat box and smaller than the radiator 71. It is supported on the back wall 13 of the display housing 10. It opposes the radiator 17. As seen from FIG. 12, the cooling-air passage 33 lies between the reservoir 72 and the radiator 71.

As illustrated in FIG. 11, the reservoir 72 has a coolant inlet port 73 and a coolant outlet port 74. The inlet port 73 and outlet port 73 are provided at the upper part and bottom of the reservoir 72, respectively, as the display unit 3 in its opened position is viewed. The tube 53 connects the coolant inlet inlet port 73 to the coolant outlet port 42 of the radiator 71. The backward path 57 connects the coolant outlet port 74 to the coolant inlet port 29 of the heat-receiving portion 22. Thus, the reservoir 72 is positioned at downstream of the radiator 71, with respect to the direction in which the liquid coolant flows. The liquid coolant cooled in the radiator 71 is guided into the reservoir 72.

As FIGS. 10 and 11 show, the reservoir 72 has a flat outer wall 75. The outer wall 75 is exposed outside the display unit 3, through the opening 54 of the display housing 10. The outer surface of this wall 75 lies in flush with the outer surface of the back wall 13 of the display housing 10.

The reservoir 72 is made of transparent synthetic resin such as polycarbonate resin or acrylic resin. Such synthetic resins are water-absorbent. The liquid coolant inevitably leaks from the reservoir 72 after a long use of the reservoir 72. In view of this it is desired that the reservoir 72 be made of transparent synthetic resin that can absorb 0.4% of water at most. If made of such a transparent resin, the reservoir 72 can control the evaporation of the liquid coolant and, ultimately, shortage thereof.

As illustrated in FIG. 10, a scale 76 is provided on the outer wall 75 of the reservoir 72. With reference to the scale 76 it is possible to determine the amount of the liquid coolant in the reservoir 72. That is, the amount of the coolant is read from the level L of the liquid coolant against the scale 76. The scale 76 consists of marks arranged at regular intervals in the direction of height of the display unit 3.

In the third embodiment described above, the reservoir 72 exposed outside the display housing 10 is transparent. The level L of the liquid coolant in the reservoir 72 can be seen from outside the display housing 10 through the outer wall 75 of the reservoir 72. The user can check the level L against the scale 76 provided on the outer wall 75 of the reservoir 72. He or she can therefore visually know the amount of the liquid coolant from outside the portable computer 1.

When the liquid coolant decreases in amount, the user can immediately recognize this. It is therefore possible to prevent the efficiency of cooling the CPU 17 from falling due to the shortage of the liquid coolant.

The liquid coolant, if colored, enables the user to recognize the level L of the liquid coolant in the reservoir 72, more readily than otherwise.

FIG. 13 shows a fourth embodiment of the present invention.

The fourth embodiment is a modification of the third embodiment. In the fourth embodiment, the outer wall 75 of the radiator 71 is painted, but one part, in the same color as the display housing 10. Thus, the outer wall 75 has a transparent check window 80. The check window 80 is an elongated one extending in the direction of height of the display unit 3. A scale 76 is provided on the check window 80 to enable the user to recognize the level L of the liquid coolant.

More specifically, the user may check the level L of the coolant against the scale 76. He or she can therefore visually know the amount of the liquid coolant from outside the portable computer 1.

Figure 14:
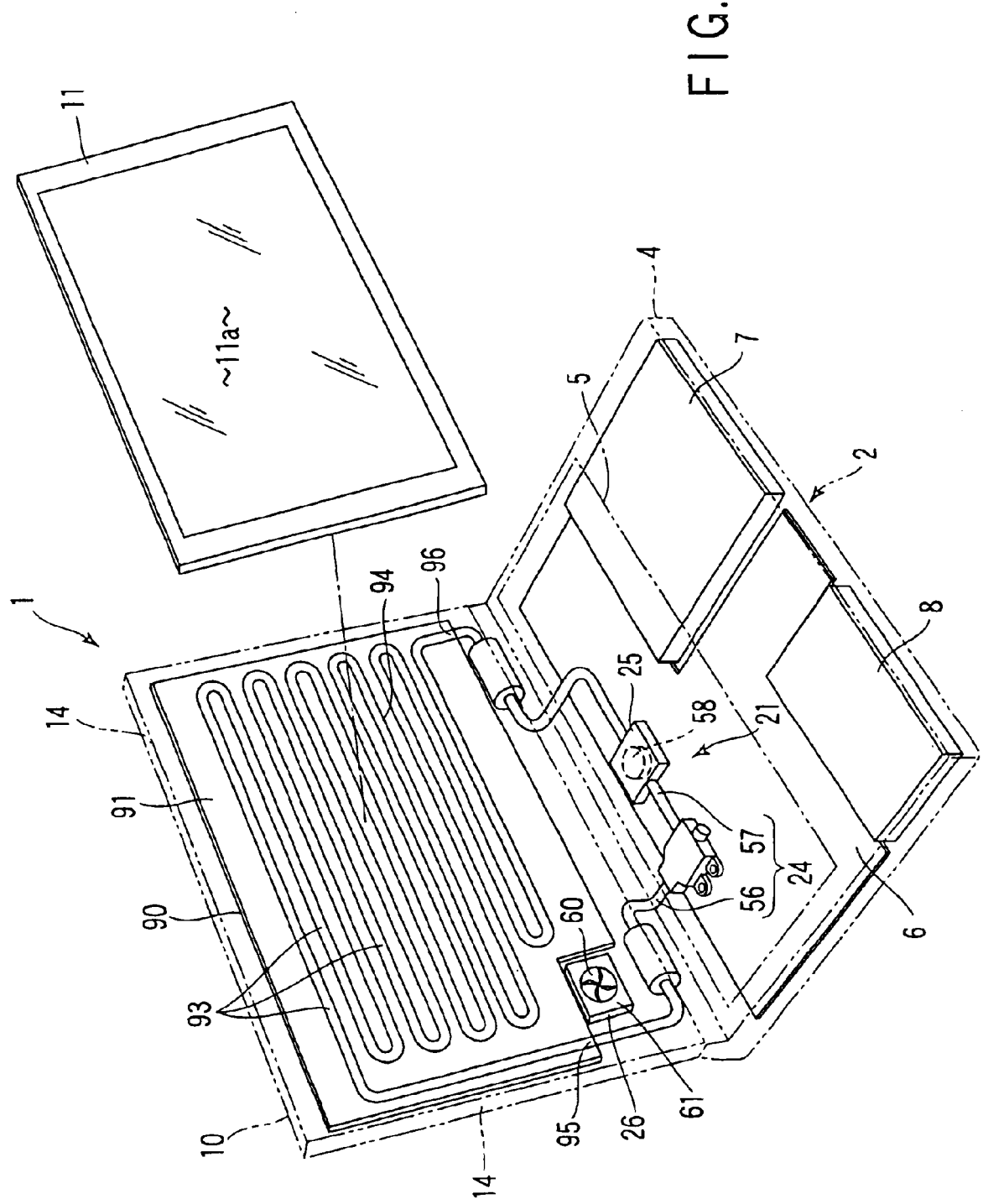
FIG. 14 is a perspective view of a portable computer according to a fifth embodiment of this embodiment, which incorporates a cooling unit of liquid cooling type.
Figure 15:
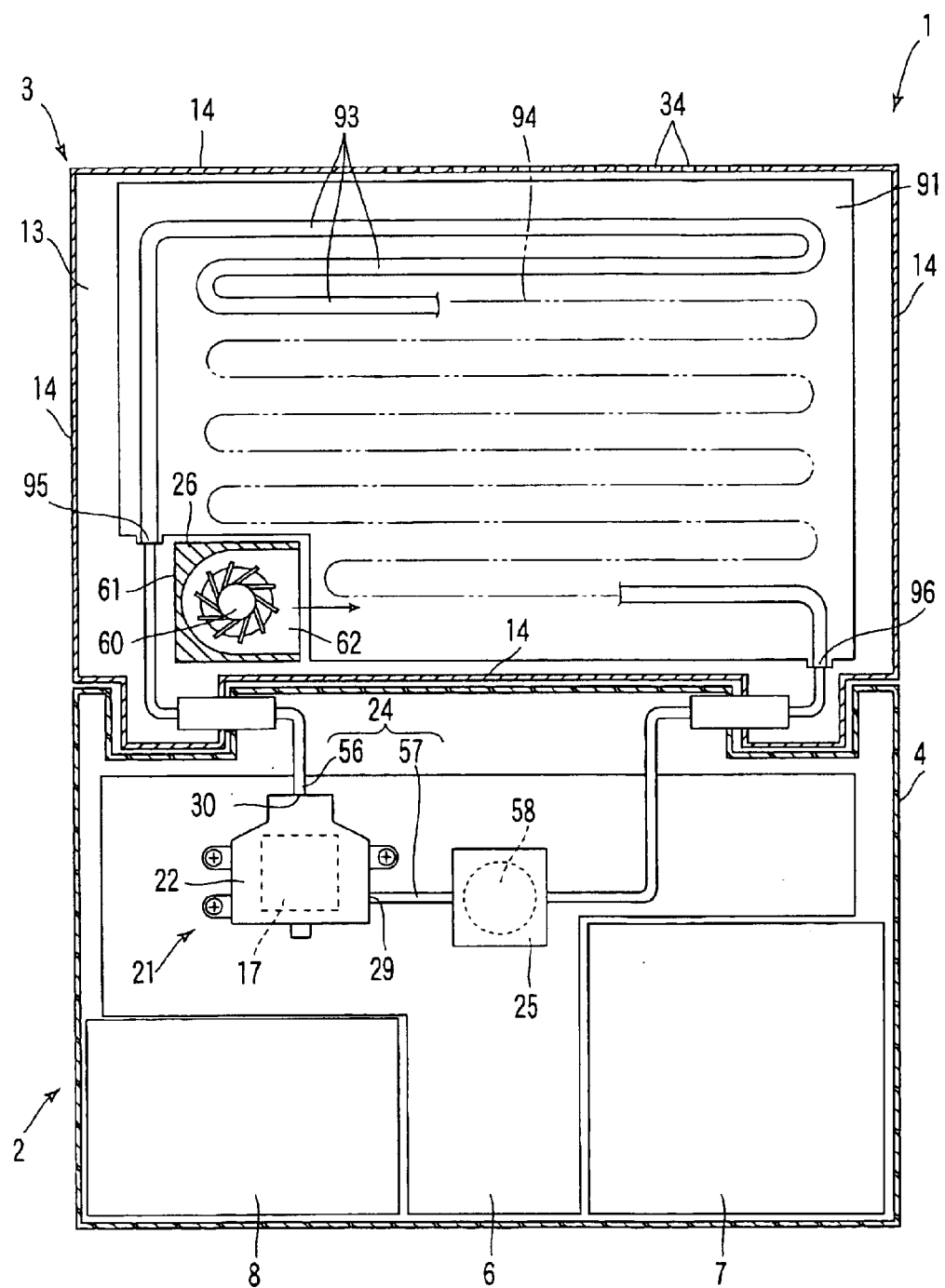
FIG. 15 is a sectional view of the portable computer according to the fifth embodiment, which incorporates the cooling unit.
Figure 16:
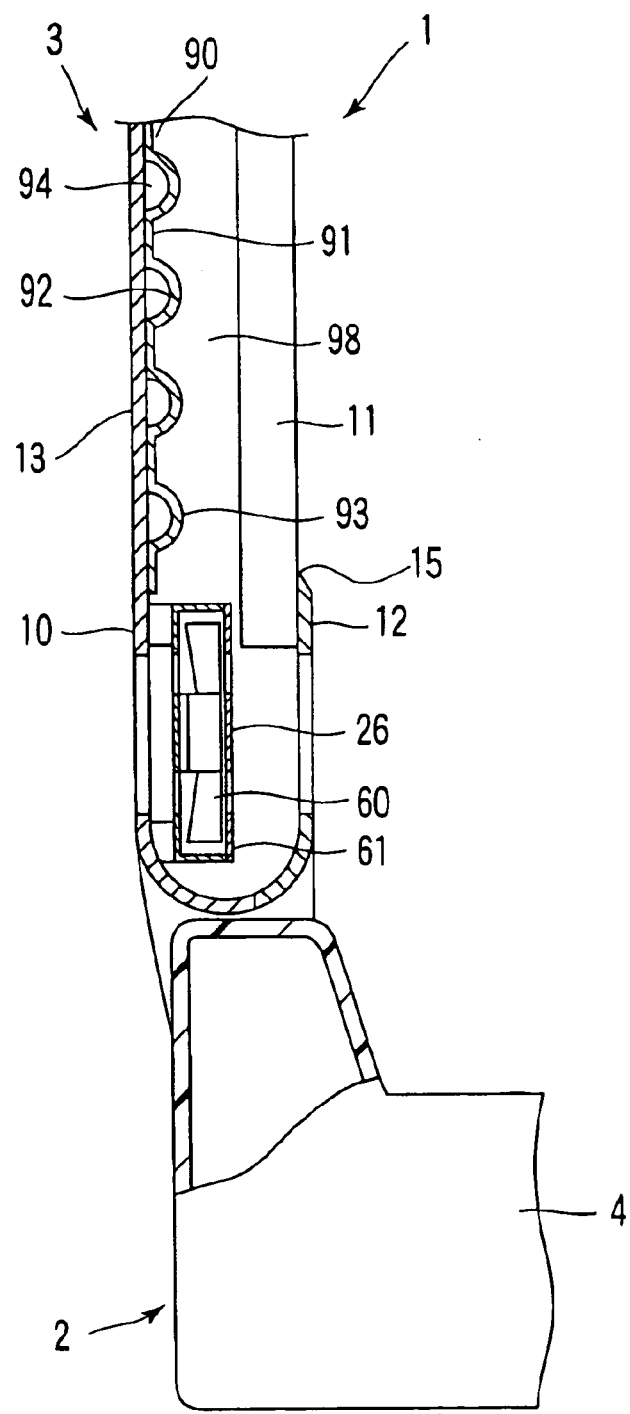
FIG. 16 is a sectional view of the portable computer according to the fifth embodiment, which depicts the positional relation between the radiator and the display unit.

FIGS. 14 to 16 show a fifth embodiment of this invention.

The fifth embodiment differs from the first embodiment in the structure of a heat-radiating portion 90 that is incorporated in the display unit 3. In any other respect the portable computer 1 according to the fifth embodiment is identical to the first embodiment.

As seen from FIG. 16, a passage-defining member 91 is secured to the inner surface of the back wall 13 of the display housing 10. The member 91 and the display housing 10 are made of metal excelling in heat conductivity, such as aluminum alloy.

The passage-defining member 91 is, for example, a rectangular plate. The member 91 has almost the same size as the liquid crystal display panel 11. It is laid upon the inner surface of the back wall 13 of the display housing 10. The member 91 has a bulging part 92. The bulging part 92 swells from the back wall 13 toward the liquid crystal display panel 11 and opens to the back wall 13. As FIG. 15 shows, the bulging part 92 is a long trough and meanders over almost the entire passage-defining member 91. It has straight portions 93 that extend parallel to one another and are spaced apart from one another. The back wall 13 closes the opening of the bulging part 93. Thus, the back wall 13 and the bulging part 93 define a coolant passage 94 in which the liquid coolant flows. This means that the display housing 10 of the display unit 3 functions as a radiator.

The passage-defining member 91 has a coolant inlet port 95 and a coolant outlet port 96. The ports 95 and 96 are spaced apart in the widthwise direction of the display unit 3. The coolant inlet port 95 is located at the upstream of the coolant passage 94. The forward path 56 connects the coolant inlet port 95 to the coolant outlet port 30 of the heat-receiving part 22. The coolant outlet port 96 is located at the downstream of the coolant passage 94. The backward path 57 connects the coolant outlet port 96 to the coolant inlet port 29 of the heat-receiving part 22.

As FIG. 16 shows, the passage-defining member 91 and the liquid crystal display panel 11 define a cooling-air passage 98. The cooling-air passage 98 communicates, at its upstream end, with the air-discharging port 62 of the electric fan 26. The cooling air discharged via the air-discharging port 62 is guided into the coolant-air passage 98. The bulging part 92 of the passage-defining member 91 is exposed to the cooling-air passage 98. The bulging part 92 therefore functions as a heat-radiating fin.

In the fifth embodiment, the coolant passage 94 is formed on the back wall 13 of the display housing 10 that is made of metal. The display housing 10 can therefore serves as a radiator. The heat of the CPU 17 is transferred directly to the back wall 13. The heat can diffuse in the entire display housing 10. Hence, all surface of the display housing 10 can be effectively used as a heat-radiating surface.

In addition, the back wall 13 can radiate heat with a high efficiency because the back wall 13 of the display housing 10 contacts the air outside the portable computer 1. The heat of the CPU 17, which has been transferred to the back wall 13, can be efficiently radiated. As a result, the efficiency of cooling the CPU 17 increases.

In the embodiments described above, the display unit contains the electric fan that cools the radiator or radiators. The electric fan may not be used at all. If this is the case, the radiator or radiators may be subjected to natural cooling.

Moreover, the heat-generating component is not limited to a CPU. Rather, it may be, for example, a chip set in the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic apparatus comprising:
    a heat-generating component;
    a main unit having a heat-receiving portion thermally connected to the heat-generating component;
    a display unit supported by the main unit;
    a heat-radiating portion provided in the display unit and radiating the heat generated by the heat-generating component; and
    a circulating path circulating liquid coolant between the heat-receiving portion and the heat-radiating portion,
    wherein the heat-radiating portion includes a first radiator and a second radiator which located, respectively, at the upstream and downstream of the liquid coolant, and the second radiator is exposed outside the display unit.

2. The electronic apparatus according to claim 1, wherein the first and second radiators have each a coolant passage in which the liquid coolant flows.

3. The electronic apparatus according to claim 1, wherein the display unit incorporates a display panel, and the first and second radiators oppose one another at the back of the display panel.

4. The electronic apparatus according to claim 3, wherein the display unit has a front wall at which the display panel is exposed and a back wall which faces away from the front wall, and the second radiator is exposed at the back wall.

5. The electronic apparatus according to claim 2, wherein the second radiator has a first heat-radiating plate and a second heat-radiating plate which are laid one upon the other, and the coolant passage is provided between the heat-radiating plates.

6. The electronic apparatus according to claim 5, wherein the first heat-radiating plate is made of transparent material and exposed outside the display unit.

7. The electronic apparatus according to claim 6, wherein the first heat-radiating plate is made of synthetic resin that absorbs 0.4% of water at most, and the second heat-radiating plate is made of metal.

8. The electronic apparatus according to claim 6, wherein the liquid coolant is colored.

9. The electronic apparatus according to claim 1, further comprising:
   a pump installed in the circulating path to deliver the liquid coolant and which starts to be driven when the temperature of the heat-generating component reaches a predetermined value.

10. The electronic apparatus according to claim 1, further comprising:
    a cooling-air passage provided between the first and second radiators and in which cooling air flows.

11. The electronic apparatus according to claim 10, wherein the second radiator has a first heat-radiating plate and a second heat-radiating plate, which are laid on upon the other, the second heat-radiating plate has a bulging part which wells from the first heat-radiating plate and which opens to the first heat-radiating plate, the first heat-radiator plate closes the opening of the bulging part, forming a coolant passage in which the liquid coolant flows, and the bulging part of the second heat-radiating plate is exposed to the cooling-air passage.

12. The electronic apparatus according to claim 10, further comprising an electric fan which applies cooling air into the cooling-air passage and which is provided in the display unit.

13. An electronic apparatus comprising:
    a heat-generating component;
    a main unit having a heat-receiving portion thermally connected to the heat-generating component;
    a display unit supported by the main unit;
    a heat-radiating portion provided in the display unit and radiating the heat generated by the heat-generating component;
    a circulating path circulating liquid coolant between the heat-receiving portion and the heat-radiating portion; and
    a fan provided in the display unit and which applies cooling air to the heat-radiating portion,
    wherein the heat-radiating portion includes a first radiator and a second radiator which located, respectively, at the upstream and downstream of the liquid coolant, the first and second radiators have a coolant passage each, in which the liquid coolant flows, and oppose each other in the direction of thickness of the display unit and forming a cooling-air passage, and the second radiator is exposed outside the display unit.

14. The electronic apparatus according to claim 13, wherein the first and second radiators have each a first heat-radiating plate and a second heat-radiating plate laid upon the first heat-radiating plate, the second heat-radiating plate has a bulging part which swells from the first heat-radiating plate and which opens to the first heat-radiating plate, the first heat-radiating plate closes the opening of the bulging part, forming the coolant passage, and the bulging part of the second heat-radiating plate is exposed to the cooling-air passage.

15. The electronic apparatus according to claim 14, wherein the bulging part of the first radiator and the bulging part of the second radiator are displaced from each other, not facing each other.

16. The electronic apparatus according to claim 13, wherein the second radiator is smaller than the first radiator.

17. An electronic apparatus comprising:
    a heat-generating component;
    a main unit having a heat-receiving portion thermally connected to the heat-generating component;
    a display unit supported by the main unit;
    a heat-radiating portion provided in the display unit and radiating the heat generated by the heat-generating component;
    a circulating path circulating liquid coolant between the heat-receiving portion and the heat-radiating portion; and
    a reservoir provided in the display unit, which contains liquid coolant to flow in the circulating passage, which is located at the downstream of the liquid coolant with respect to the heat-radiating portion, and which is exposed outside the display unit.

18. The electronic apparatus according to claim 17, further comprising a cooling-air passage provided between the heat-radiating portion and the reservoir and an electric fan which applies cooling air into the cooling-air passage.

19. The electronic apparatus according to claim 17, wherein the reservoir is made of transparent material and the liquid coolant is colored.

20. The electronic apparatus according to claim 19, wherein the reservoir has a scale which is exposed outside the display unit and against which the level of the liquid coolant in the reservoir is checked to determine the amount of the liquid coolant.

\* \* \* \* \*